(12) United States Patent
Iwata et al.

(10) Patent No.: US 11,576,359 B2
(45) Date of Patent: Feb. 14, 2023

(54) FISHING ROD

(71) Applicant: SHIMANO INC., Sakai (JP)

(72) Inventors: Soshi Iwata, Sakai (JP); Wataru Tashiro, Sakai (JP); Hironori Takahashi, Sakai (JP)

(73) Assignee: SHIMANO INC., Osaka (JP)

( * ) Notice: Subject to any disclaimer, the term of this patent is extended or adjusted under 35 U.S.C. 154(b) by 100 days.

(21) Appl. No.: 16/765,955

(22) PCT Filed: Oct. 4, 2018

(86) PCT No.: PCT/JP2018/037230
§ 371 (c)(1),
(2) Date: May 21, 2020

(87) PCT Pub. No.: WO2019/111516
PCT Pub. Date: Jun. 13, 2019

(65) Prior Publication Data
US 2020/0352149 A1    Nov. 12, 2020

(30) Foreign Application Priority Data

Dec. 5, 2017    (JP) .............................. JP2017-233472

(51) Int. Cl.
*A01K 87/02*     (2006.01)
*A01K 87/08*     (2006.01)

(52) U.S. Cl.
CPC .............. *A01K 87/08* (2013.01); *A01K 87/02* (2013.01)

(58) Field of Classification Search
CPC ........ A01K 87/02; A01K 87/08; A01K 87/00; A01K 87/06

(Continued)

(56) References Cited

U.S. PATENT DOCUMENTS 2,839,864 A * 6/1958 Martin ................... A01K 87/08
43/23
3,196,572 A * 7/1965 Steinle ................... A01K 87/06
43/22

(Continued)

FOREIGN PATENT DOCUMENTS

FR    1407872 A  *  6/1964
FR    2698239 A1 *  5/1994    ............. A01K 87/02

(Continued)

OTHER PUBLICATIONS

International Search Report dated Nov. 13, 2018, issued in counterpart application No. PCT/JP2018/037230 (2 pages).

*Primary Examiner* — Darren W Ark
*Assistant Examiner* — Katelyn T Truong
(74) *Attorney, Agent, or Firm* — WHDA, LLP

(57) ABSTRACT

A fishing rod includes a grip tube 2 on a rear side of a reel seat 1 having a cylindrical shape, and the grip tube 2 is hard. The grip tube 2 includes a first grip portion 20 having a large diameter and forming at a front part of the grip tube 2, a second grip portion 22 having a large diameter and forming at a rear part of the grip tube 2, and a small-diameter portion 21 forming at between the first grip portion 20 and the second grip portion 22. A corner portion 23 is formed at between the first grip portion 20 and the small-diameter portion 21. The small-diameter portion 21 has a concave curved shape decreasing in diameter rearward at the front part of the small-diameter portion 21 which adjacent to the corner portion 23.

10 Claims, 10 Drawing Sheets

(58) Field of Classification Search
USPC ......... 43/23, 22, 18.1 R, 18.1 CT; 16/110.1, 16/111.1, 421, 430; 473/516, 524, 537, 473/538, 549
See application file for complete search history.

(56) References Cited

U.S. PATENT DOCUMENTS

| | | | | | |
|---|---|---|---|---|---|
| 3,197,908 | A | * | 8/1965 | Hirsch | A01K 87/06 43/22 |
| 3,206,204 | A | * | 9/1965 | Lacoste | A63B 51/10 473/549 |
| 3,466,783 | A | * | 9/1969 | Priebe, Jr. | A01K 87/00 43/18.5 |
| 4,578,890 | A | * | 4/1986 | Childre | A01K 87/06 43/20 |
| 4,828,261 | A | * | 5/1989 | Kleylein | A63B 49/08 473/538 |
| 5,160,139 | A | * | 11/1992 | Soong | A63B 53/14 473/549 |
| 5,239,768 | A | * | 8/1993 | Michishita | D02G 3/444 242/441 |
| 5,425,534 | A | * | 6/1995 | Chen | A63B 49/08 473/549 |
| 5,537,773 | A | * | 7/1996 | Matsubara | A01K 87/08 43/22 |
| 5,671,926 | A | * | 9/1997 | Hagey | A63B 60/12 473/549 |
| 5,881,489 | A | * | 3/1999 | Young | A01K 87/06 43/20 |
| 8,298,101 | B2 | * | 10/2012 | Babolat | A63B 60/00 473/549 |
| 2006/0135295 | A1 | * | 6/2006 | Szelenyi | A63B 60/00 473/549 |
| 2007/0191155 | A1 | * | 8/2007 | Babolat | A63B 60/20 473/549 |
| 2012/0180374 | A1 | * | 7/2012 | Saunders | A01K 97/10 43/23 |
| 2014/0173967 | A1 | * | 6/2014 | Iwata | A01K 87/08 43/18.1 R |
| 2014/0366327 | A1 | * | 12/2014 | Huang | A01K 87/08 16/421 |
| 2015/0208629 | A1 | * | 7/2015 | Galhardo | A01K 87/08 43/18.1 CT |

FOREIGN PATENT DOCUMENTS

| | | | | | |
|---|---|---|---|---|---|
| GB | 1048123 | A | * | 5/1962 | |
| JP | 6-70565 | U | | 10/1994 | |
| JP | 2001-352867 | A | | 12/2001 | |
| JP | 2003070388 | A | * | 3/2003 | |
| JP | 2003-339281 | A | | 12/2003 | |
| JP | 2004173682 | A | * | 6/2004 | ............ A01K 87/02 |
| JP | 2006-191874 | A | | 7/2006 | |
| JP | 2008-17711 | A | | 1/2008 | |
| JP | 3139298 | U | | 2/2008 | |
| JP | 2012-5378 | A | | 1/2012 | |
| JP | 2015-123065 | A | | 7/2015 | |
| JP | 2017-12065 | A | | 1/2017 | |
| JP | 2017-131154 | A | | 8/2017 | |
| KR | 2017095046 | A | * | 8/2017 | |
| WO | WO-2015093692 | A1 | * | 6/2015 | ............ A01K 87/02 |

* cited by examiner

FISHING ROD

TECHNICAL FIELD

The present invention relates to a fishing rod including a first grip portion and a second grip portion on a rear side of a cylindrical reel seat.

BACKGROUND ART

In a fishing rod including a first grip portion and a second grip portion on a rear side of a cylindrical reel seat, a front-rear pair of cylindrical grip bodies made of cork or foaming resin is mounted on an outer peripheral surface of a rod body, the first grip portion is formed from the grip body on a front side, and the second grip portion is formed from the grip body on the rear side. If the grip portion is made of cork or foaming resin as described above, there is an advantage in that the grip portion can be tightly gripped because the material is soft. On the other hand, a vibration transmitted to the rod body tends to be attenuated by a material such as cork and be hardly transmitted to a hand. Further, the grip portion may be tightly gripped during, for example, casting of a heavy lure, and in such a situation, the grip portion being tightly gripped is slightly deformed. Such slight deformation of the grip portion being gripped results in weakening of the sense of unity between the fishing rod and the hand.

CITATION LIST

Patent Literature

[PTL 1] Japanese Unexamined Patent Publication No. 2015-123065
[PTL 2] Japanese Unexamined Patent Publication No. 2012-5378

SUMMARY OF INVENTION

Technical Problem

An object of the present invention is to allow for linear operability and operability with a direct feeling in a fishing rod including a first grip portion and a second grip portion on a rear side of a cylindrical reel seat.

Solution to Problem

The present invention has been made to solve the above problems, and a fishing rod according to the present invention includes a reel seat having a cylindrical shape and a grip tube on a rear side of the reel seat, and the grip tube is hard. In the fishing rod, the grip tube includes a first grip portion having a large diameter and forming at a front part of the grip tube, a second grip portion having a large diameter and forming at a rear part of the grip tube, and a small-diameter portion forming at between the first grip portion and the second grip portion. Note that a rod tip side is defined as the front side and a rod tail side is defined as the rear side.

In the fishing rod having this configuration, the first grip portion and the second grip portion are integrally formed in the grip tube, and thus, the fishing rod has excellent vibration transmission characteristics, and the vibration is transmitted directly from the first grip portion and the second grip portion to a hand. Further, even if the first grip portion or the second grip portion is tightly gripped, or if the hand is strongly pressed against the first grip portion or the second grip portion, the first grip portion and the second grip portion are hardly deformed. Further, for example, in case of single hand casting in which the reel seat or the first grip portion is gripped by one hand, the first grip portion is hardly deformed during the casting, and thus, a cast feeling with a linear and direct feeling can be achieved. Further, double hand casting may be performed in which the reel seat or the first grip portion is gripped with one hand, and the second grip portion is gripped with the other hand during the casting. In particular, double hand casting is effective for casting a heavy lure. Even in the case of such double hand casting, the first grip portion and the second grip portion are hardly deformed, and thus, a cast feeling with linear and direct feeling can be achieved. Moreover, the first grip portion and the second grip portion are not formed as separate members independent of each other, but are each integrally formed in the grip tube being a single member, and thus, a strong sense of unity is obtained between the hand gripping the first grip portion and the hand gripping the second grip portion, and the two hands do not wobble separately. Thus, a cast operation can be performed with a firm grip feeling of both hands. Accordingly, even a heavy lure can be cast without shaking, and delicate control can also be performed easily.

In particular, it is preferable that a first corner portion is formed at a boundary part between the first grip portion and the small-diameter portion. By providing the first corner portion at a rear end of the first grip portion in this manner, the first grip portion and the small-diameter portion are clearly divided by the first corner portion. Therefore, an angler can easily recognize the presence and the range of the first grip portion based on tactile sensation of his hand due to the presence of the first corner portion, and can surely grip the first grip portion. Further, the first corner portion is formed at a boundary part between the first grip portion and the small-diameter portion, and thus, the hand griping the first grip portion is less likely to be displaced toward the small-diameter portion side. Further, a finger such as a little finger can be hooked on a rear side of the first corner portion. Thus, the first grip portion can be firmly gripped, and hand fatigue can also be reduced.

Further, it is preferable that the small-diameter portion has a first concave curved shape decreasing in diameter rearward at the front part of the small-diameter portion which adjacent to the first corner portion. The front part of the small-diameter portion rises toward the first corner portion, and thus, a convex shape of the first corner portion stands out and the first grip portion is even more clearly divided. Further, when a finger is hooked on the rear side of the first corner portion, the finger is even more conveniently hooked and the first grip portion can be gripped even more firmly.

Further, it is preferable that a second corner portion is formed at a boundary part between the second grip portion and the small-diameter portion, and it is preferable that the small-diameter portion has a second concave curved shape increasing in diameter rearward at the rear part of the small-diameter portion which adjacent to the second corner portion. By forming the second corner portion on the front end of the second grip portion, the second grip portion and the small-diameter portion are clearly divided by the second corner portion. Therefore, the angler can easily recognize the presence and the range of the second grip portion based on the tactile sensation of his hand due to the second corner portion, and can surely grip the second grip portion. Further, the second corner portion is formed at a boundary part between the second grip portion and the small-diameter portion, and thus, the hand griping the second grip portion is less likely to be displaced toward the small-diameter portion side. Further, a finger such as an index finger can be hooked on the front side of the second corner portion, and the second grip portion can be firmly gripped. In particular, a pronounced effect can be obtained when double hand casting is performed.

Further, it is preferable that the grip tube is made of a fiber-reinforced resin, and the small-diameter portion includes a straight portion having a constant diameter. By choosing a fiber-reinforced resin for the grip tube, both weight reduction and high rigidity can be achieved, and excellent vibration transmission characteristics can also be achieved. Further, the grip tube is formed by attaching a prepreg to a mandrel and heating and firing of the obtained product. In this formation of the grip tube, the mandrel may have a structure that is split into two portions in the front-rear direction, and the front mandrel and the rear mandrel may be joined in the front-rear direction to form a single mandrel. When the mandrel is pulled out after the prepreg is attached to an outer peripheral surface of the mandrel and the obtained product is heated and fired, the front mandrel is pulled out forward, and the rear mandrel is pulled out rearward. When the mandrel has the structure that is split into two portions in the front-rear direction, the front and rear mandrels can be joined at a position of the straight portion. By preparing a plurality of front mandrels and rear mandrels having different lengths of the straight portion, grip tubes having different lengths of the straight portion can be easily manufactured.

Further, it is preferable that the fishing rod includes a rod body, the small-diameter portion includes a straight portion having a constant diameter, and the rod body extends rearward from the reel seat into the grip tube and is connected to the straight portion. The straight portion can be supported from the inside by the rod body. Further, the reel seat and the grip tube can be connected via the rod body.

In particular, it is preferable that the rod body includes a main body extending forward from the reel seat and a joint body having a tubular shape and being joined on an outer peripheral of a rear part of the main body, and it is preferable that the joint body extends rearward from the reel seat and is connected to the straight portion, and the reel seat is attached to an outer peripheral of the joint body. By providing the joint body separate from the main body, it is possible to reduce restrictions on the design of the main body. Further, the diameter of the joint body can be easily adjusted to the reel seat or the straight portion. Further, by attaching the reel seat to the outer peripheral of the joint body and joining the main body to an inner side of the joint body, it is not necessary to design a butt portion of the main body to be excessively thick, and excellent aesthetic appearance can be achieved.

Further, it is preferable that the joint body includes a front joining part having a constant large diameter, a rear joining part having a constant small diameter, and an tapered portion forming at between the front joining part and the rear joining part and having a diameter that gradually decreases rearward, the reel seat and the main body are attached to the front joining part, and the straight portion is attached to the rear joining part. According to this configuration, the diameter of the straight portion can be easily reduced, and a large constricted shape can be formed between the first grip portion and the second grip portion. Due to the constricted shape, the diameter of the first grip portion and the second grip portion can be relatively increased, and a clear grip shape can be formed.

Further, it is preferable that the fishing rod includes a rod body and a tail plug, and the tail plug is attached to the grip tube, and the rod body extends rearward from the reel seat into the grip tube and is connected to the tail plug. According to this configuration, the rod body and the grip tube can be connected via the tail plug. Further, the grip tube can be held from the front side and the rear side by the reel seat and the tail plug.

Further, it is preferable that a cylindrical portion extends rearward from a rear end of the reel seat and the cylindrical portion is inserted and fixed inside the first grip portion. The first grip portion can be supported from the inside by the cylindrical portion. Further, the reel seat and the grip tube can be connected by the cylindrical portion.

In particular, it is preferable that a supporting body is provided between the reel seat and the grip tube, the supporting body includes a flange projecting outward in a radial direction, a front cylindrical portion extending forward from the flange, and a rear cylindrical portion extending rearward from the flange, a recessed portion is formed in the rear end of the reel seat, the front cylindrical portion is inserted and fixed inside the recessed portion, the rear cylindrical portion is inserted and fixed inside the first grip portion, and the flange is sandwiched between the rear end of the reel seat and the front end of the grip tube. By providing the supporting body separately from the reel seat, the supporting body can be made of metal, for example. Further, the flange sandwiched between the rear end of the reel seat and the front end of the grip tube can be served as a decorative ring, and the outer appearance of the boundary part between the reel seat and the grip tube can be improved. Further, by bringing the rear end of the reel seat and the front end of the grip tube into contact with the flange, the reel seat, the supporting body, and the grip tube can be easily positioned in a front-rear direction. Further, the rear end of the reel seat and the front end of the grip tube can be connected via the supporting body.

Advantageous Effects of Invention

As described above, the grip tube is provided on the rear side of the reel seat, and the first grip portion, the small-diameter portion, and the second grip portion are integrally formed in the grip tube, and thus, linear operability and operability with a direct feeling can be achieved.

DESCRIPTION OF EMBODIMENTS

Figure 1:
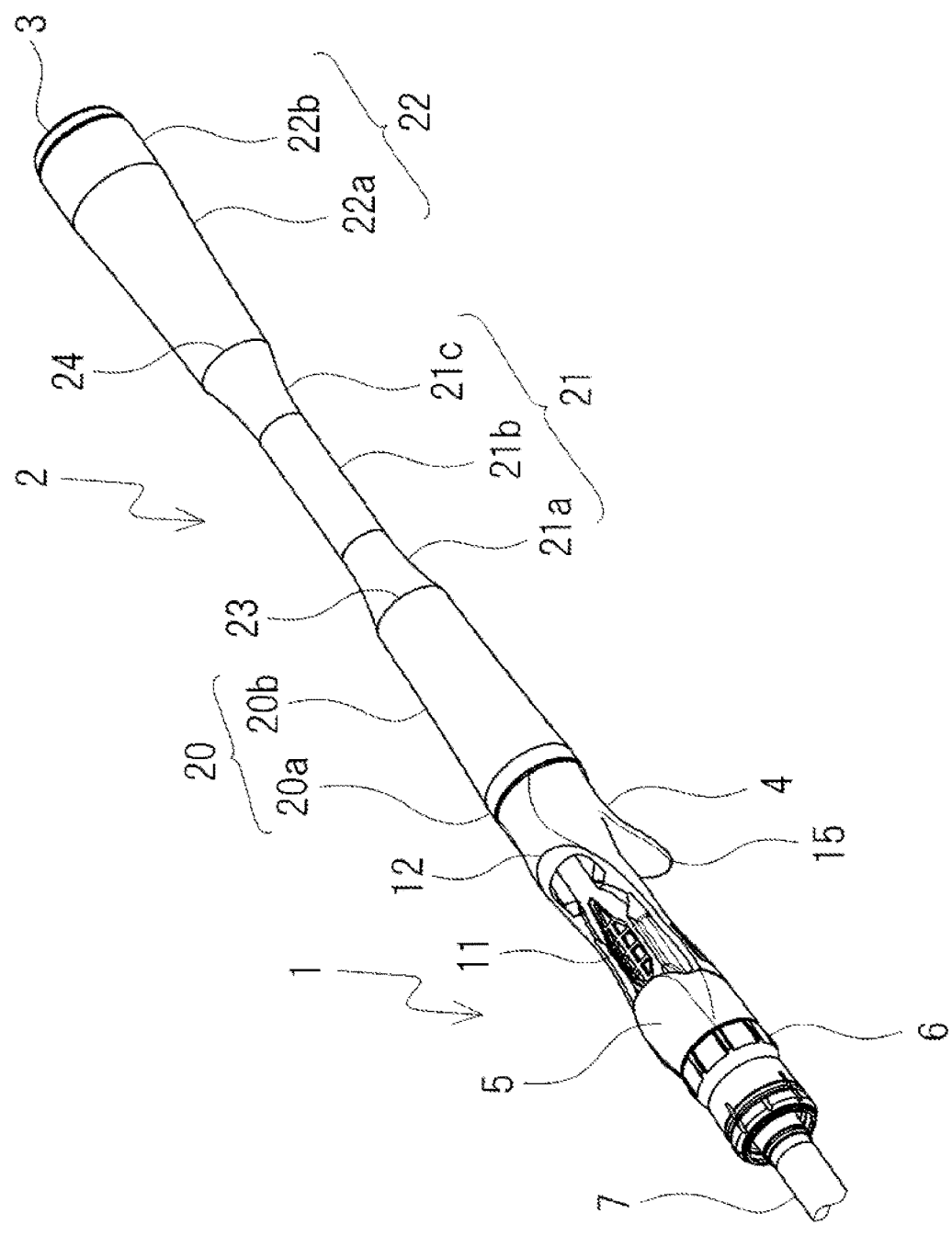
FIG. 1 is a perspective view illustrating main parts of a fishing rod according to an embodiment of the present invention.
Figure 2:
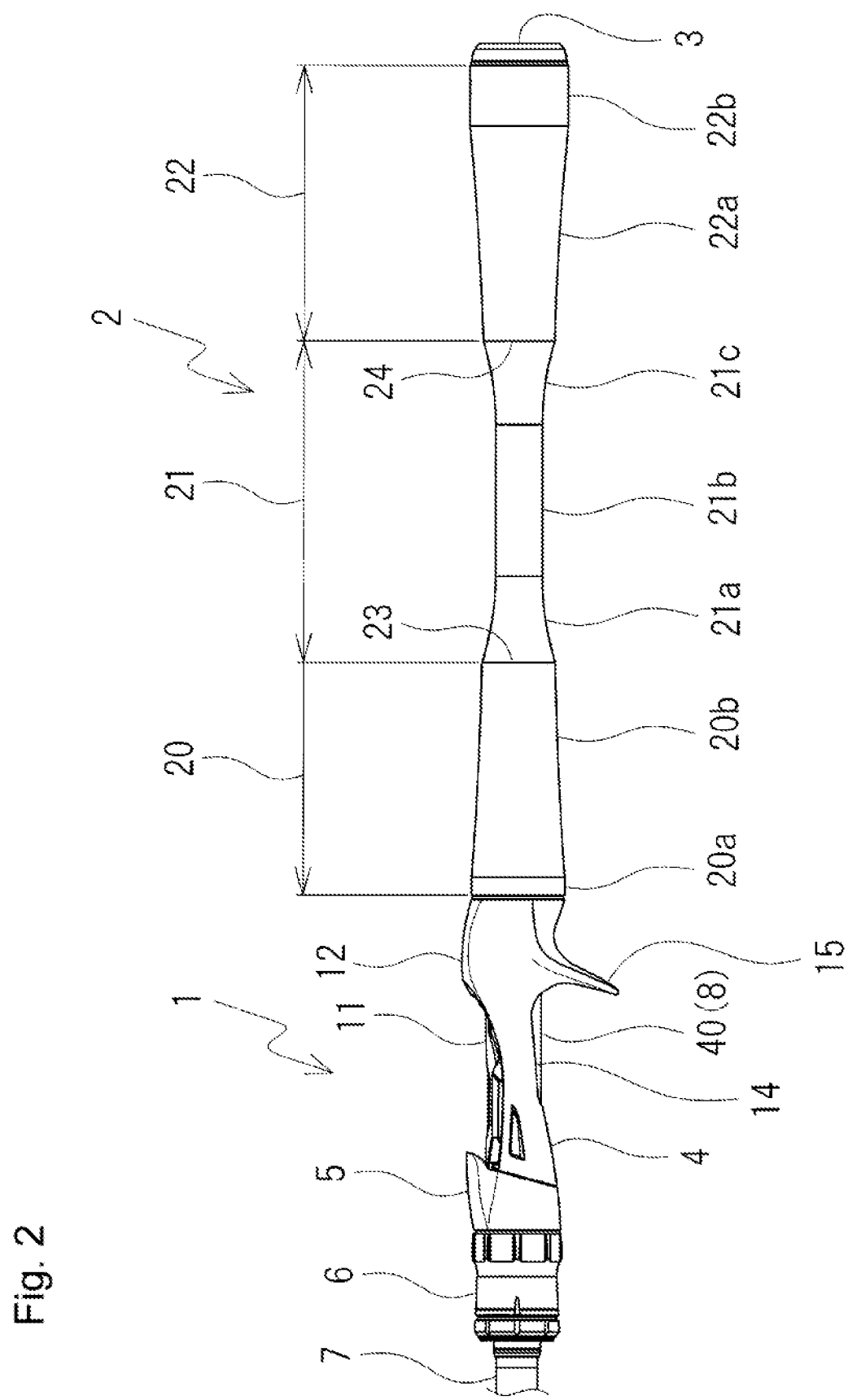
FIG. 2 is a front view of main parts of the fishing rod.
Figure 3:
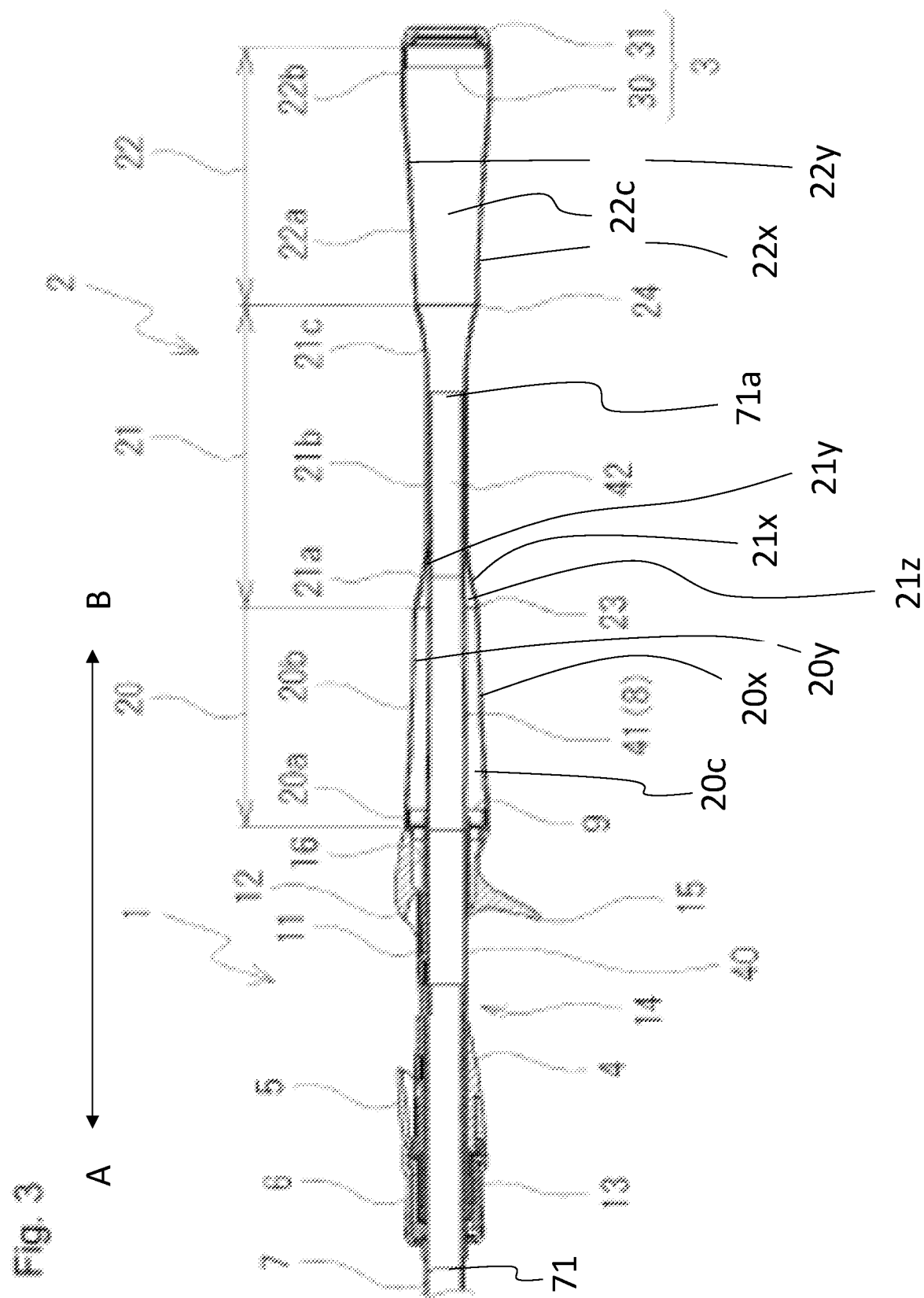
FIG. 3 is a vertical cross-sectional view of main parts of the fishing rod.

Below, a fishing rod according to an embodiment of the present invention will be described with reference to FIGS. 1 to 9B. As illustrated in FIGS. 1 to 3, the fishing rod according to the present embodiment includes a reel seat 1 for attaching a reel (not illustrated), and a grip tube 2 provided on a rear side of the reel seat 1. The reel seat 1 has a cylindrical shape and also called a pipe seat. The reel seat 1 is mounted at a predetermined position on an outer peripheral of rod bodies (blanks) 7 and 8 of the fishing rod, and is fixed non-movably to the rod bodies 7 and 8. The fishing rod extends from a forward side A to a rear side B.

The reel seat 1 according to the present embodiment is a reel seat for fixing a double-bearing reel (not illustrated). In a normal use state, the double-bearing reel is located on an upper side of the fishing rod. Thus, in FIG. 1 and the other figures, as in the use state, a reel foot attachment portion 11 for supporting a bottom surface of a reel foot of the double-bearing reel is oriented upward. Note that a rod tip side is defined as the front side, a rod tail side is defined as the rear side, a reel mounting side is defined as an upper side, and an opposite side to the upper side is defined as a bottom side.

The reel seat 1 is attached non-movably to the rod bodies 7 and 8. The reel seat 1 includes a cylindrical reel seat main body 4, a cylindrical movable hood 5 that is externally mounted on the reel seat main body 4 and serves for fixing a front end of the reel foot, and a fixing nut 6 for moving the movable hood 5 in an axial direction and fixing the movable hood 5 at a desired position. The movable hood 5 and the fixing nut 6 are located on a front side of the reel seat main body 4.

The reel seat main body 4 is formed by one member. A material of the reel seat main body 4 may be a synthetic resin, a metal, or the like, but is particularly preferably a resin molded product formed by using injection molding from a hard synthetic resin. The synthetic resin may be of various types, but is preferably a fiber-reinforced resin, and particularly preferably a fiber-reinforced resin using short fibers having a length of 1 mm or less as reinforcing fibers. Further, carbon fibers are preferable as the reinforcing fiber.

Figure 4:
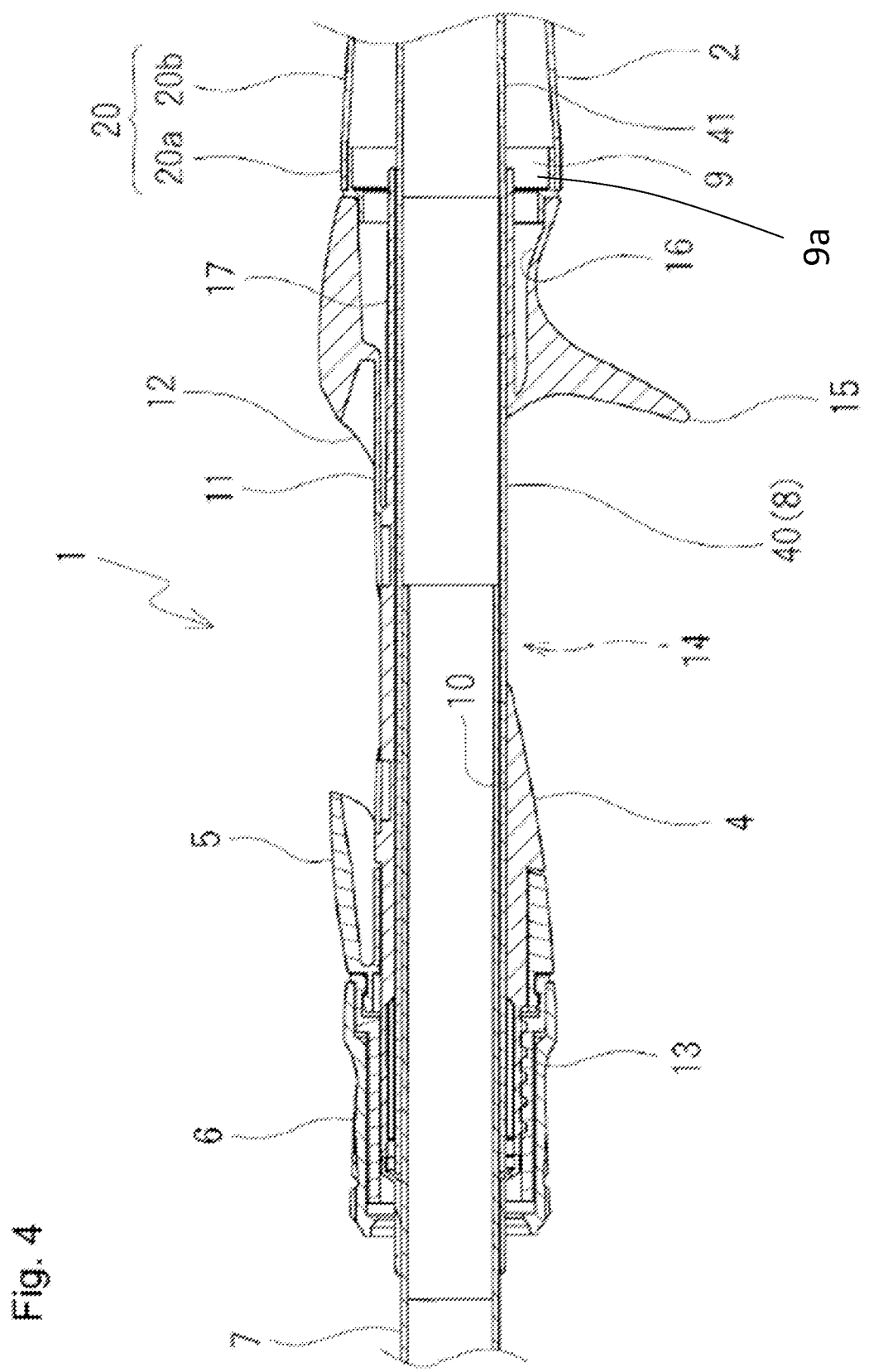
FIG. 4 is an enlarged vertical cross-sectional view of main parts of the fishing rod.
Figure 5:
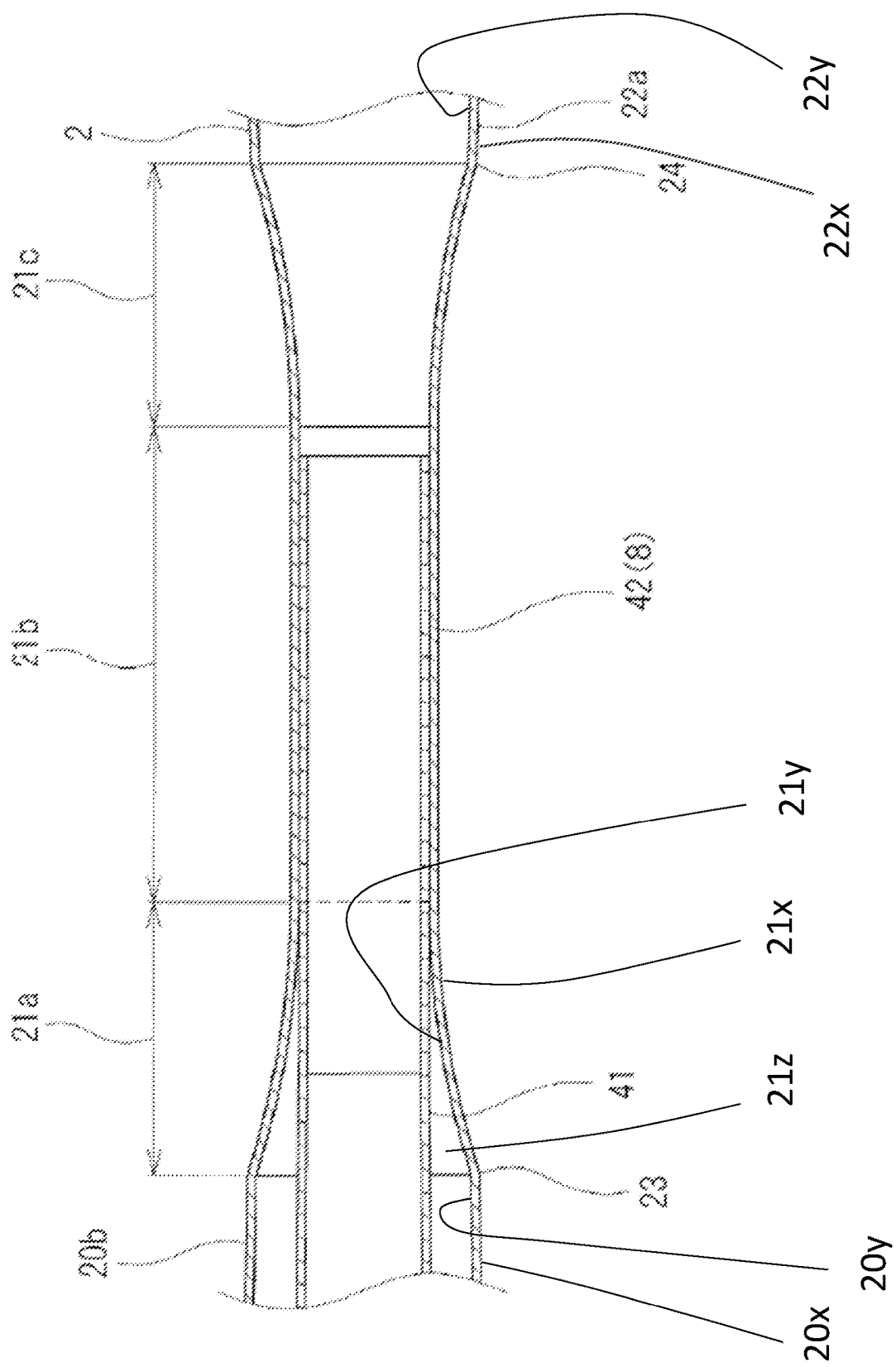
FIG. 5 is an enlarged vertical cross-sectional view of main parts of the fishing rod.
Figure 7:
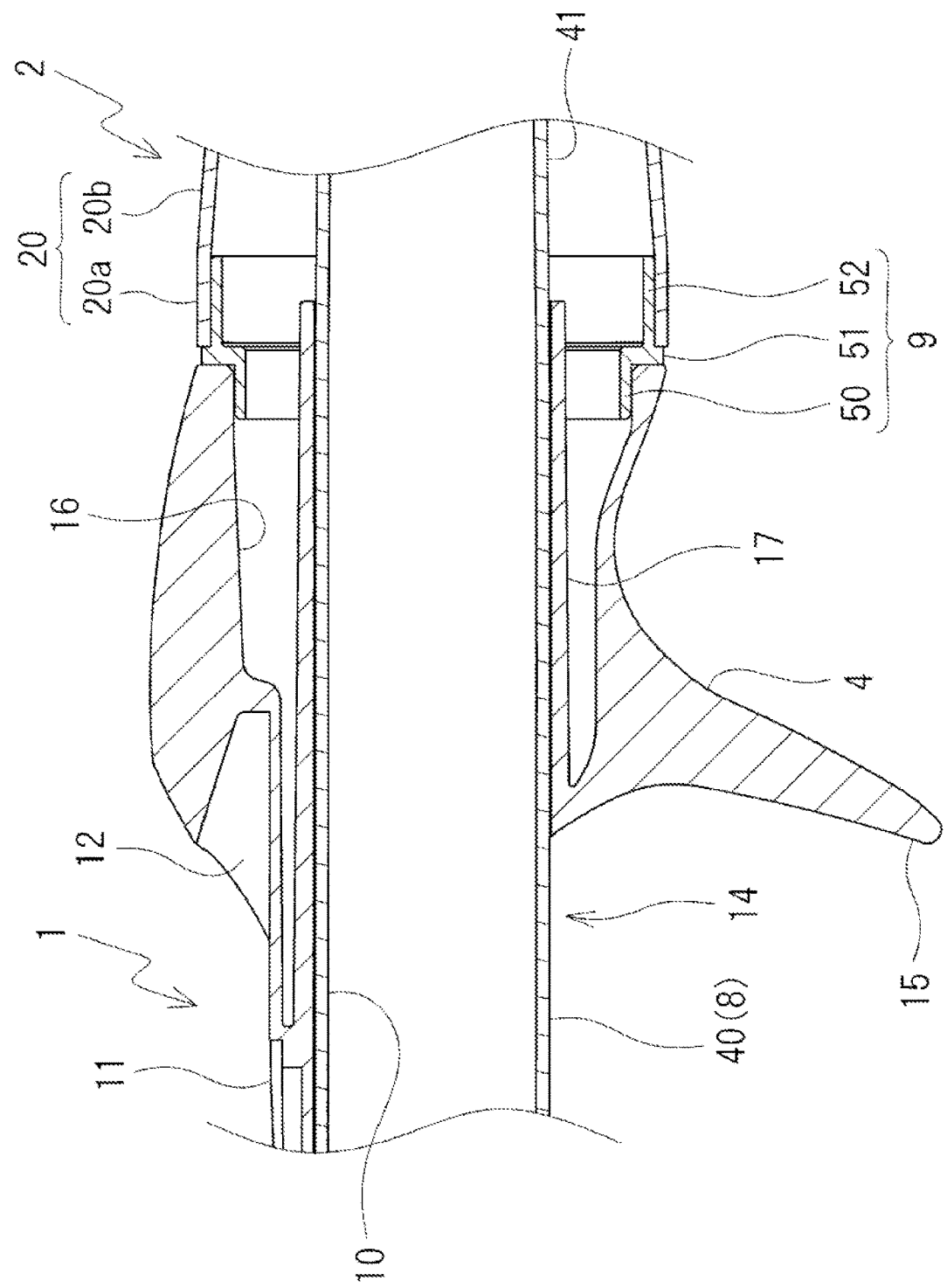
FIG. 7 is an enlarged vertical cross-sectional view of main parts of the fishing rod.

As illustrated in FIGS. 4 and 7, a rod insertion hole 10 penetrating in a front-rear direction is formed in the reel seat main body 4. Accordingly, the rod insertion hole 10 is opened in each of a front end and a rear end of the reel seat main body 4. The rod bodies 7 and 8 are inserted through the rod insertion hole 10, and the reel seat main body 4 is adhered and fixed to an outer peripheral surface of the rod bodies 7 and 8, directly or with a spacer interposed between the reel seat main body 4 and the rod bodies 7 and 8. In the present embodiment, the reel seat main body 4 is directly adhered and fixed to the rod bodies 7 and 8 without using a spacer, as described below. The reel foot attachment portion 11 on which the reel foot is placed is formed on an upper side being a reel mounting side of the reel seat main body 4. A fixing hood 12 is integrally formed on the rear side of the reel foot attachment portion 11. The fixing hood 12 is formed on the upper side of the reel seat main body 4 and is opened to a front side in the axial direction. A rear end of the reel foot is inserted into the fixing hood 12 from the front side, and the rear end of the reel foot is held by the fixing hood 12. A male screw 13 is formed on an outer peripheral surface of a front part of the reel seat main body 4.

On a bottom surface of the reel seat main body 4, a trigger 15 for hooking a finger is provided so as to project downward. The trigger 15 is located substantially under the fixing hood 12. A window hole 14 is formed on the bottom surface of the reel seat main body 4 at a position on a front of the trigger 15. The window hole 14 reaches the rod insertion hole 10, and a joint body 8 described below is partially exposed from the window hole 14. A recessed portion 16 is formed on the rear end of the reel seat main body 4. The recessed portion 16 is formed on an outer side of a rear end opening of the rod insertion hole 10 and is located between the rear end opening of the rod insertion hole 10 and an outer peripheral surface of a rear end of the reel seat main body 4. The recessed portion 16 may have any size and depth, however, in the present embodiment, the upper portion of the recessed portion 16 reaches an inner side of the fixing hood 12, further extends forward beyond the fixing hood 12, and extends to an inner side of a rear part of the reel foot attachment portion 11, and the lower portion of the recessed portion 16 extends to an inner side of the trigger 15. Accordingly, in a region where the recessed portion 16 is formed, a thin rear cylindrical main body portion 17 is formed between the rod insertion hole 10 and the recessed portion 16. Note that a rear end of the rear cylindrical main body portion 17 projects slightly more rearward than the rear end surface of the reel seat main body 4.

The fixing nut 6 is screwed onto the male screw 13 of the reel seat main body 4, and the movable hood 5 is located on a rear side of the fixing nut 6. In the reel seat main body 4, the male screw 13 is partially cut out so that a guide groove (not illustrated) extending linearly in the axial direction is formed and the movable hood 5 slides in the axial direction by being guided by the guide groove of the reel seat main body 4. The movable hood 5 is engaged with the fixing nut 6 so that the movable hood 5 can rotate relative to the fixing nut 6. Thus, by rotating the fixing nut 6, the movable hood 5 moves, without rotating, forward or backward together with the fixing nut 6.

The front end of the reel foot is inserted into the movable hood 5 from the rear side, and the front end of the reel foot is held by the movable hood 5. By moving the movable hood 5 rearward, the movable hood 5 approaches the fixing hood 12, and the reel foot is held from the front side and the rear side by the movable hood 5 and the fixing hood 12, respectively, and thus, the reel can be fixed to the fishing rod. Further, by moving the movable hood 5 forward, that is, by separating the movable hood 5 from the fixing hood 12, the reel foot is released from the fixed state, and the reel can be removed from the fishing rod.

<Rod Bodies 7 and 8>

The rod bodies 7 and 8 include a main body 7 and the joint body 8 joined and integrated so as to form an overlapping portion of a predetermined length on a rear end of the main body 7. A rear end of the main body 7 and a front end of the joint body 8 are joined and integrated. The main body 7 and the joint body 8 are joined inside the reel seat 1. The main body 7 extends forward from the reel seat 1, and the joint body 8 extends rearward from the reel seat 1. The main body 7 is joined to an inner of the joint body 8, and the reel seat 1 is mounted on an outer of the joint body 8. The fishing rod may be any type of fishing rod, such as a jointed rod or a telescopic rod. For example, in the case of a one-piece rod, the main body 7 has a single-piece structure continuing to the tip, and in the case of a two-piece rod, the main body 7 has a two-piece structure with a tip-side rod body and a base-side rod body. The rod bodies 7 and 8 are made of fiber-reinforced resin. If the rod bodies 7 and 8 are tubular, the rod bodies 7 and 8 are formed by winding a prep reg around a mandrel and heating and firing of the obtained product. Various types of fibers such as carbon fibers can be used as the reinforcing fibers. Accordingly, the joint body 8 can also be formed by winding a prepreg around a mandrel. Note that the main body 7 may be solid.

<Joint Body 8>

The joint body 8 is a tubular body having a substantially constant thickness. The joint body 8 may have a constant diameter throughout the entire length, or may have a tapered shape in which the diameter gradually increases rearward, however, in the present embodiment, the joint body 8 is formed of three parts. That is, the joint body 8 includes a front joining part 40 forming at a front part and having a constant large diameter, a rear joining part 42 forming at a rear part and having a constant small diameter, and a tapered portion 41 forming at a middle part and having an inversely tapered shape in which the diameter gradually decreases rearward. The reel seat 1 is mounted on the front joining part 40. Specifically, an inner peripheral surface of the reel seat main body 4 is directly adhered and fixed to an outer peripheral surface of the front joining part 40. A front end of the front joining part 40 is located near a front end of the reel seat main body 4, and a rear end of the front joining part 40 is located near a rear end of the reel seat main body 4. Accordingly, the front joining part 40 has a length corresponding to the reel seat main body 4, that is, substantially the same length as the reel seat main body 4, and substantially the entire length of the reel seat main body 4 is fixed over substantially the entire length of the front joining part 40. The front joining part 40 is visible from the window hole 14 of the reel seat main body 4. Further, the rear part of the main body 7 is joined to an inner side of the front joining part 40. The main body 7 may be joined to the front joining part 40 throughout the entire length of the front joining part 40, and the joining length may be any length, however, in the present embodiment, the main body 7 is joined to a region having a length of at least half of the entire length on the front side of the front joining part 40. The tapered portion 41 and the rear joining part 42 project rearward from the reel seat main body 4. An outer diameter of the rear joining part 42 is substantially the same as an outer diameter of the rear end of the main body 7. Accordingly, the difference between an outer diameter of the front joining part 40 and the outer diameter of the rear joining part 42 corresponds to the thickness of the joint body 8, specifically, the thickness of the front joining part 40.

<Grip Tube 2>

Figure 8:
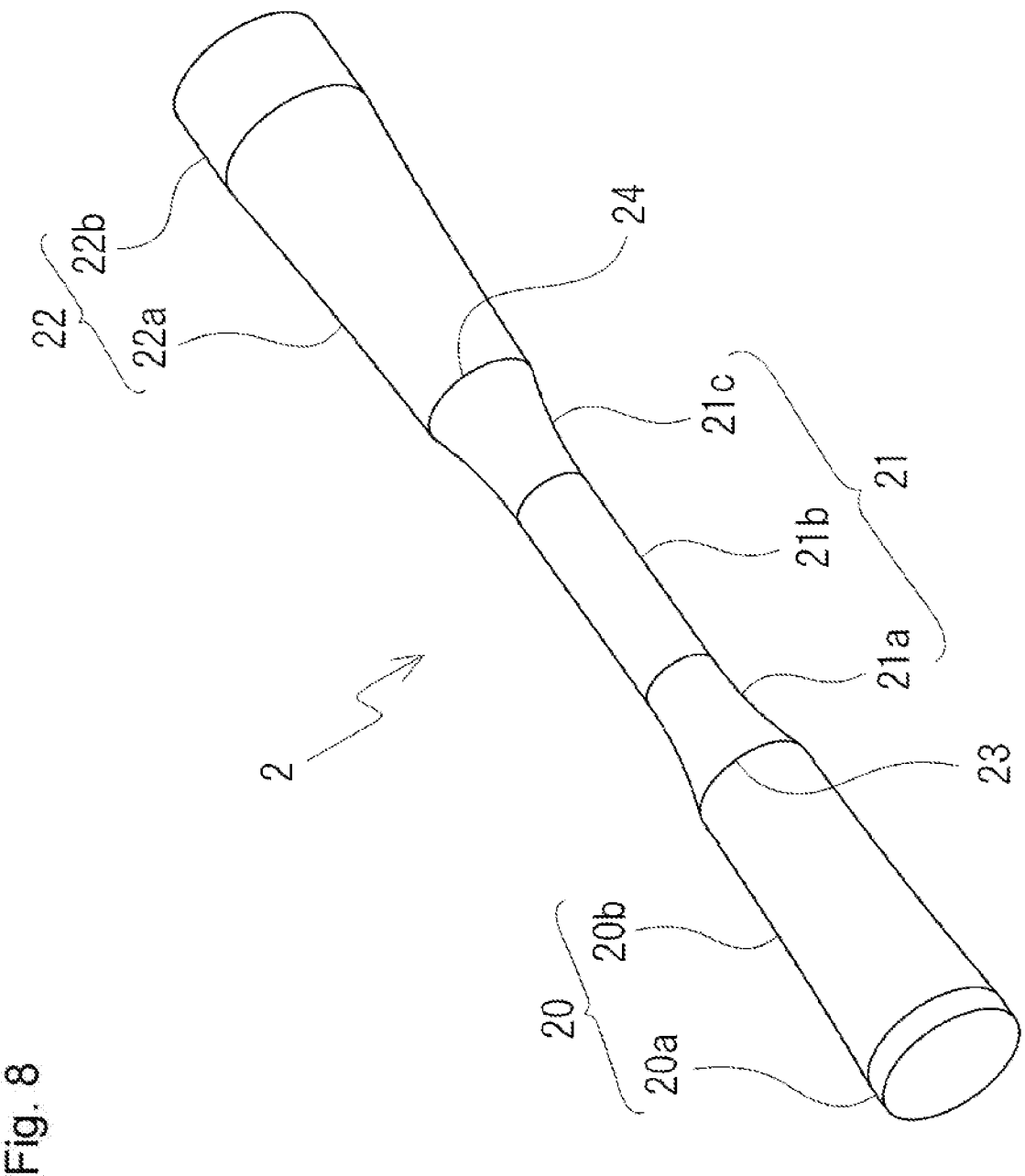
FIG. 8 is a perspective view illustrating a grip tube of the fishing rod.

The grip tube 2 is connected to a rear side of the reel seat main body 4, and a tail plug 3 is attached to a rear end of the grip tube 2. Accordingly, the grip tube 2 forms a region between the reel seat main body 4 and the tail plug 3. The grip tube 2 is formed of a single thin hard tubular body. FIG. 8 illustrates the grip tube 2 alone. The grip tube 2 is divided into three parts in the front-rear direction, and includes a first grip portion 20 having a large diameter and forming at a front part, a second grip portion 22 having a large diameter and forming at a rear part, and a small-diameter portion 21 having a small diameter and forming at a middle part between the first grip portion 20 and the second grip portion 22. The second grip portion 22 is separated rearward from the first grip portion 20. The grip tube 2 is joined to the reel seat main body 4 at the first grip portion 20, and the tail plug 3 is attached to the second grip portion 22. Accordingly, the first grip portion 20 is located immediately behind the reel seat 1, and the second grip portion 22 is located at a predetermined distance separated rearward from the reel seat 1 and is located immediately before the tail plug 3.

The first grip portion 20 includes a front part and a rear part. The first grip portion 20 includes a straight portion 20a forming at a front part of the first grip portion 20, and a tapered portion 20b forming at a rear part of the first grip portion 20. The straight portion 20a forms at a front part of the grip tube 2. The straight portion 20a is shorter than the tapered portion 20b, and the tapered portion 20b forms a large part of a length of the first grip portion 20. The straight portion 20a has a constant diameter, and an outer diameter of the straight portion 20a is substantially the same as an outer diameter of the rear end of the reel seat main body 4. The tapered portion 20b is a main part of the first grip portion 20, and has an inversely tapered shape in which the diameter gradually decreases rearward. It is preferable that the outer diameter of the first grip portion 20 at the rear end of the tapered portion 20b is 75% or more of the outer diameter of the first grip portion 20 at the front end of the tapered portion 20b. The tapered portion 20b may have a shape in which the diameter decreases linearly at a constant rate of change rearward, or a concave curved shape decreasing in diameter rearward, or a convex curved shape decreasing in diameter rearward.

The small-diameter portion 21 is formed by three parts in the front-rear direction. The small-diameter portion 21 is formed by a tapered portion 21a forming at a front part, a straight portion 21b forming at a middle part, and a tapered portion 21c forming at a rear part. The tapered portion 21a is a part adjacent to a rear side of the first grip portion 20 and has an inversely tapered shape in which the diameter gradually decreases rearward. The tapered portion 21a may have a shape in which the diameter decreases linearly at a constant rate of change rearward, or a concave curved shape decreasing in diameter rearward, or a convex curved shape decreasing in diameter rearward. However, the tapered portion 21a has preferably the concave curved shape, and in the present embodiment, the tapered portion 21a has the concave curved shape. The straight portion 21b has a constant diameter and may have any length, however, in the present embodiment, the straight portion 21b is longer than the tapered portion 21a and the tapered portion 21c. The tapered portion 21c has a tapered shape in which the diameter gradually increases rearward. The tapered portion 21c may have a shape in which the diameter increases linearly at a constant rate of change rearward, or a concave curved shape increasing in diameter rearward, or a convex curved shape increasing in diameter rearward. However, the tapered portion 21c has preferably the concave curved shape, and in the present embodiment, the tapered portion 21c has the concave curved shape. It is preferable that the front end and the rear end of the small-diameter portion 21 have the same diameter.

The second grip portion 22 may have any length, however, in the present embodiment, the second grip portion 22 is longer than the first grip portion 20. The second grip portion 22 includes a front part and a rear part. The second grip portion 22 includes a tapered portion 22a forming at a front part of the second grip portion 22 and a straight portion 22b forming at a rear part of the second grip portion 22. The straight portion 22b is shorter than the tapered portion 22a, and the tapered portion 22a forms a large part of a length region of the second grip portion 22. The tapered portion 22a is a part adjacent to the rear side of the small-diameter portion 21 and forms a main part of the second grip portion 22. The tapered portion 22a has a tapered shape in which the diameter gradually increases rearward. It is preferable that the outer diameter of the second grip portion 22 at the front end of the tapered portion 22a is 70% or more of the outer diameter of the second grip portion 22 at the rear end of the tapered portion 22a. The tapered portion 22a may have a shape in which the diameter increases linearly at a constant rate of change rearward, or a concave curved shape increasing in diameter rearward, or a convex curved shape increasing in diameter rearward. The straight portion 22b forms a rear end of the grip tube 2. The straight portion 22b has a constant diameter, and the tail plug 3 is attached to an inner side of the straight portion 22b. The straight portion 22b may have the same diameter as the straight portion 20a or may have a smaller diameter than the straight portion 20a, however, in the present embodiment, the diameter of the straight portion 22b is larger than the diameter of the straight portion 20a.

Corner portions 23 and 24 are formed at a boundary part between the first grip portion 20 and the small-diameter portion 21 and at a boundary part between the second grip portion 22 and the small-diameter portion 21, respectively. The first grip portion 20 and the small-diameter portion 21 are clearly divided by the front corner portion 23, and the second grip portion 22 and the small-diameter portion 21 are clearly divided by the rear corner portion 24. Each of the corner portions 23 and 24 have a chevron shape projecting outward in a radial direction, in a vertical cross-sectional view obtained by cutting the grip tube 2 along a plane including a center line of the grip tube 2, and is formed throughout the entire circumference. At each of the corner portions 23 and 24, the two surface parts adjacent to each other in the front-rear direction forms a shape like a bent part, and at each of the corner portions 23 and 24, an outer peripheral surface of the grip tube 2 has an edge shape that is pointed outward in the radial direction. The first grip portion 20 has a first outside surface 20x and a first inside surface 20y. The second grip portion 22 has a second outside surface 22x and a second inside surface 22y. The small-diameter portion 21 has a tapered portion 21a having a third outside surface 21x and a third inside surface 21y. The small-diameter portion 21 has a third hollow 21z.

<Manufacture of Grip Tube 2>

Figure 9A:
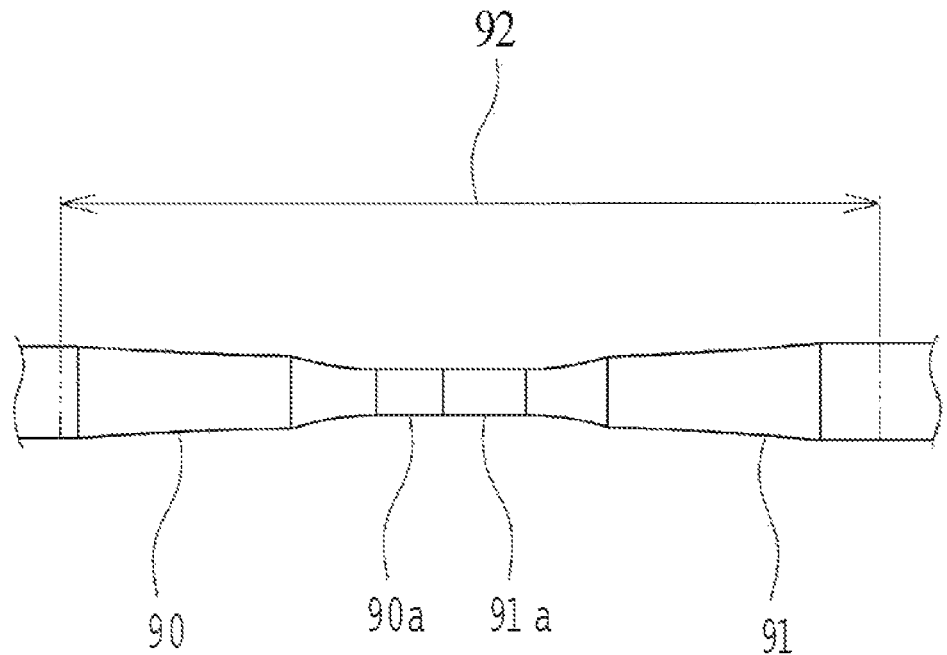
FIGS. 9A and 9B are schematic front views illustrating a mandrel used for manufacturing the grip tube of the fishing rod.
Figure 9B:
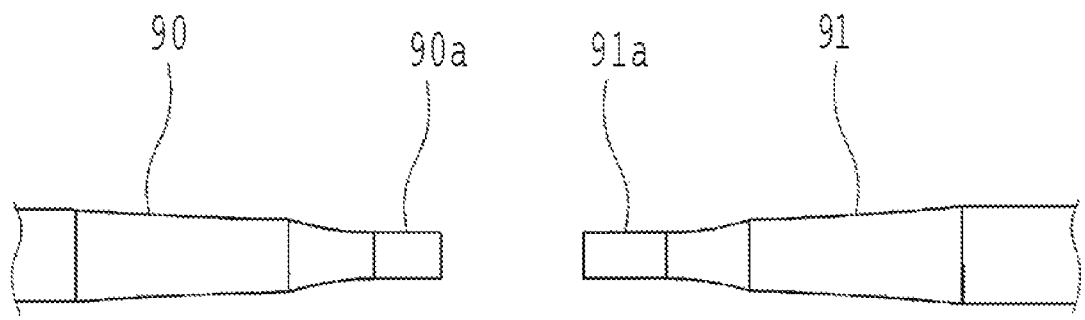

The grip tube 2 is made of fiber-reinforced resin and can be manufactured by a similar manufacturing method as the rod bodies 7 and 8. That is, the grip tube 2 can be formed in a tubular shape by attaching a prepreg to a mandrel and heating and firing of the obtained product. As illustrated in FIGS. 9A and 9B, mandrels 90 and 91 have a structure that is split into two parts in the front-rear direction. In FIG. 9A, a region indicated by reference numeral 92 is a formation region of the grip tube 2. When a prepreg (not illustrated) is attached, the front mandrel 90 and the rear mandrel 91 are joined and integrated in the front-rear direction as illustrated in FIG. 9A. To pull out the mandrels 90 and 91 from the tubular body, the front mandrel 90 is pulled out forward, and the rear mandrel 91 is pulled out rearward. The front mandrel 90 and the rear mandrel 91 are divided into front and rear parts at straight portions 90a and 91a of the mandrels 90 and 91 corresponding to the straight portion 21b, and are joined and integrated at these straight portions 90a and 91a. Accordingly, the front mandrel 90 includes the straight portion 90a at a rear part of the mandrel 90, and the rear mandrel 91 includes the straight portion 91a at a front part of the rear mandrel 91. Thus, it is preferable to join the front and rear mandrels 90 and 91 at the straight portions 90a and 91a. By preparing various front and rear mandrels 90 and 91 in which the straight portions 90a and 91a have different length and appropriately combining these front and rear mandrels 90 and 91, the length of the straight portion 21b can be easily changed, and various grip tubes 2 in which the straight portion 21b of the small-diameter portion 21 has different length can be easily manufactured.

<Tail Plug 3>

Figure 6:
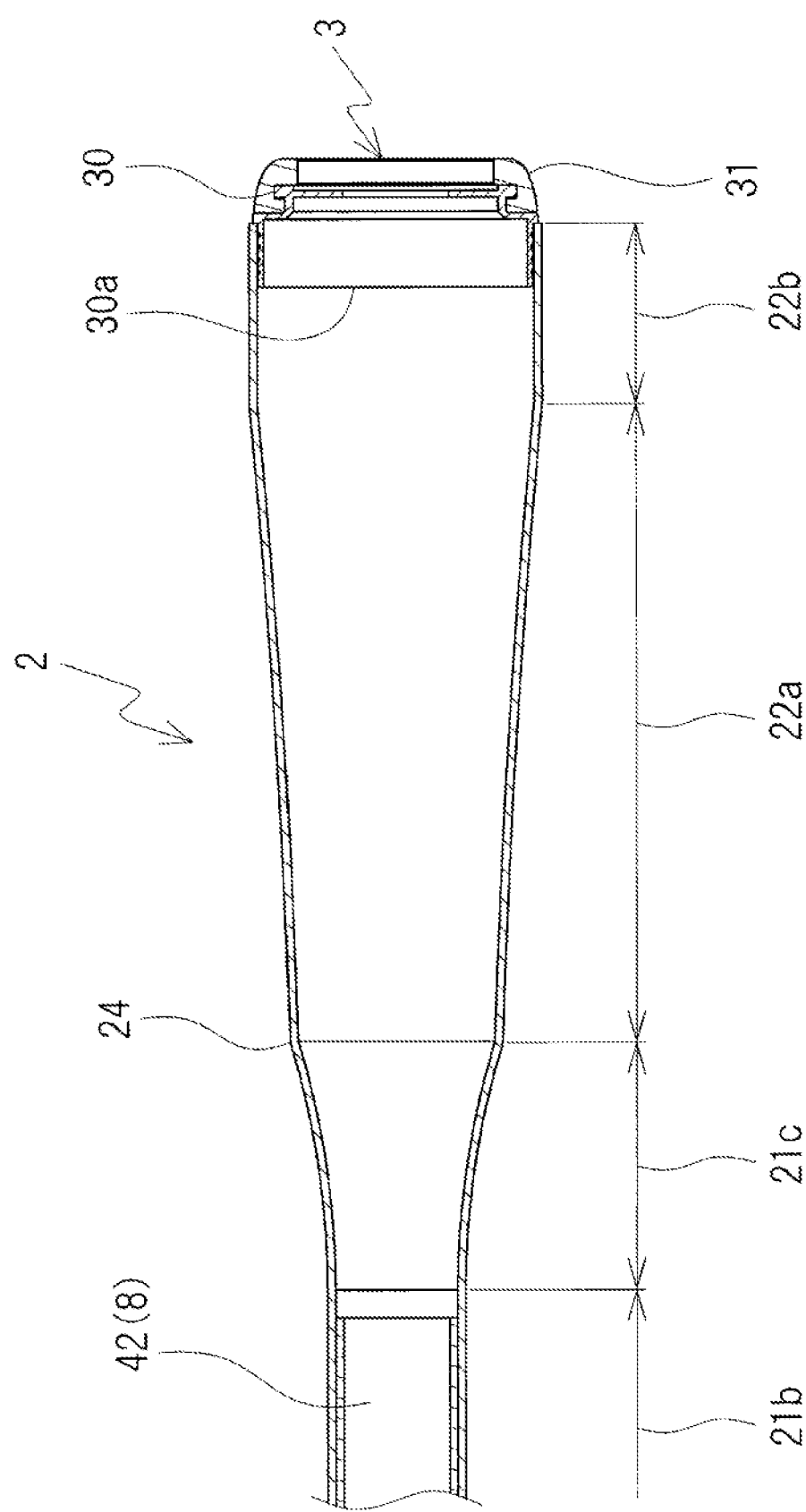
FIG. 6 is an enlarged vertical cross-sectional view of main parts of the fishing rod.

As illustrated in FIG. 6, the tail plug 3 is attached to the rear end of the grip tube 2. The tail plug 3 includes a support member 30 and a buffer member 31. The support member 30 is made of a hard synthetic resin or a metal, and is particularly preferably made of metal. The buffer member 31 is preferably made of rubber. The support member 30 includes a cylindrical insertion portion 30a to be inserted inside the rear end of the grip tube 2. The cylindrical insertion portion 30a is inserted inside the straight portion 22b, and supports and reinforces the straight portion 22b from the inside. An outer peripheral surface of the cylindrical insertion portion 30a is adhered to an inner peripheral surface of the straight portion 22b. Note that the length of the cylindrical insertion portion 30a is shorter than the length of the straight portion 22b. A rear part of the support member 30 projects rearward from the rear end of the grip tube 2. The buffer member 31 is attached from an outer side and to a rearward projecting portion of the support member 30.

<Supporting Body 9>

As illustrated in FIG. 7, a supporting body 9 is provided between the reel seat main body 4 and the grip tube 2. The front end of the grip tube 2 is connected to the rear end of the reel seat main body 4 by the supporting body 9. The supporting body 9 has a shorter length than the reel seat main body 4 and the grip tube 2. The supporting body 9 includes a flange 51 projecting outward in the radial direction, a front cylindrical portion 50 extending forward from the flange 51, and a rear cylindrical portion 52 extending rearward from the flange 51. The front cylindrical portion 50 is inserted inside the recessed portion 16. An outer peripheral surface of the front cylindrical portion 50 is adhered to an outer wall surface of the recessed portion 16. The rear cylindrical portion 52 is inserted inside the straight portion 20a. An outer peripheral surface of the rear cylindrical portion 52 is adhered to an inner peripheral surface of the straight portion 20a. The rear cylindrical portion 52 supports and reinforces the straight portion 20a from the inside. The length of the rear cylindrical portion 52 is substantially the same as the length of the straight portion 20a. Accordingly, the rear cylindrical portion 52 supports the straight portion 20a, from the inside and throughout the entire circumference and the entire length. The inner diameter of the straight portion 20a is larger than the diameter of the outer wall surface of the recessed portion 16. Accordingly, the outer diameter of the rear cylindrical portion 52 is larger than the outer diameter of the front cylindrical portion 50.

The flange 51 is sandwiched between the rear end of the reel seat main body 4 and a front end of the grip tube 2. A front surface of the flange 51 is in contact with the rear end of the reel seat main body 4, and a rear surface of the flange 51 is in contact with the front end of the grip tube 2. The only part of an outer peripheral surface of the supporting body 9 which can be seen from the outside is an outer peripheral surface of the flange 51. The outer diameter of the flange 51 is slightly smaller than the outer diameter of the straight portion 20a, and thus, the outer peripheral surface of the flange 51 is located one step further to the inside than an outer peripheral surface of the straight portion 20a. The supporting body 9 is preferably made of a metal, and the flange 51 is located between the reel seat main body 4 and the grip tube 2 in a ring-like manner, thereby improving the aesthetic appearance and the feel of the material. Note that, inside the supporting body 9, the rear cylindrical main body portion 17 is spaced from the supporting body 9. The rear end of the rear cylindrical main body portion 17 extends to the inside of the rear cylindrical portion 52.

The joint body 8 passes through the inside of the supporting body 9 and reaches the inside of the grip tube 2. The joint body 8 passes through the first grip portion 20 and extends to the inside of the small-diameter portion 21. The rear joining part 42 reaches the straight portion 21b, and an outer peripheral surface of the rear joining part 42 is adhered and fixed to an inner peripheral surface of the straight portion 21b. The rear joining part 42 supports the straight portion 21b from the inside, the reel seat main body 4 and the grip tube 2 are connected via the joint body 8, and the main body 7 and the grip tube 2 are connected via the joint body 8. An annular hollow portion 20c is formed between the first grip portion 20 and the tapered portion 21a, and the joint body 8. The annular hollow portion gradually expands forward.

The length of an overlapping portion between the rear joining part 42 and the straight portion 21b may be any length, however, the length is preferably at least half the length of the straight portion 21b. In the present embodiment, a rear end 71a of the joint body 8 is inside the straight portion 21b, however, the rear end of the joint body 8 may extend rearward beyond the straight portion 21b so as to reach the inside of the tapered portion 21c, or may extend to the inside of the second grip portion 22.

In the fishing rod configured as described above, the first grip portion 20 and the second grip portion 22 are integrally formed in the grip tube 2, and thus, compared to a configuration in which a grip portion is formed separately of cork and the like, the fishing rod has excellent vibration transmission characteristics, and the vibration is transmitted directly from the first grip portion 20 and the second grip portion 22 to the hand. Further, even if the first grip portion 20 and the second grip portion 22 are tightly gripped, the first grip portion 20 and the second grip portion 22 are hardly deformed, and even if the hand is strongly pressed against the first grip portion 20 and the second grip portion 22, the first grip portion 20 and the second grip portion 22 are hardly deformed. Therefore, linear operability can be achieved.

Also, when casting is performed, since the first grip portion 20 and the second grip portion 22 are hardly deformed, the hand gripping the fishing rod hardly shakes and a cast feeling with linear and direct feeling can be achieved. In particular, in the case of double hand casting, since the first grip portion 20 and the second grip portion 22 are integrally formed in the grip tube 2 being a single member, a strong sense of unity is obtained between a hand gripping the first grip portion 20 and a hand gripping the second grip portion 22, and the grip tube 2 can be firmly gripped with both hands during casting. Therefore, even a heavy lure can be cast without shaking, and further, delicate control can also be easily performed.

Further, the corner portions 23 and 24 are formed at the boundary part between the first grip portion 20 and the small-diameter portion 21 and at the boundary part between the second grip portion 22 and the small-diameter portion 21, respectively, and the first grip portion 20 and the second grip portion 22 are each clearly divided from the small-diameter portion 21 by the corner portions 23 and 24, and thus, the range of the first grip portion 20 and the second grip portion 22 can easily be recognized based on tactile sensation. Accordingly, the first grip portion 20 and the second grip portion 22 can be surely and easily gripped. Further, due to the front corner portion 23, the hand griping the first grip portion 20 is not easily displaced rearward, and a finger such as a little finger can be hooked on the rear side of the front corner portion 23. Thus, the first grip portion 20 can be firmly gripped, and further, hand fatigue can also be reduced. Similarly, due to the rear corner portion 24, the hand griping the second grip portion 22 is not easily displaced forward, and a finger such as an index finger can be hooked on the front side of the rear corner portion 24. Therefore, especially if double hand casting is performed, both hands hardly slip, and even a heavy lure can be easily cast, and fatigue can be reduced.

Further, each of the tapered portion 21a adjacent to the front corner portion 23 and the tapered portion 21c adjacent to the rear corner portion 24 has a concave curved shape that rises toward the front and rear corner portions 23 and 24, and thus, the convex shape of the front and rear corner portions 23 and 24 stands out and the first grip portion 20 and the second grip portion 22 are even more clearly divided. Further, if a finger is hooked on the rear side of the front corner portion 23 or on the front side of the rear corner portion 24, the finger is conveniently hooked.

Further, the rod bodies 7 and 8 are connected to the small-diameter portion 21, and thus, the vibration is transmitted directly from the rod bodies 7 and 8 to the grip tube 2, and the vibration is transmitted directly from the grip tube 2 to the hand. That is, the vibration transmitted to the rod bodies 7 and 8 is transmitted from the rod bodies 7 and 8 to the reel seat main body 4 and transmitted from the reel seat main body 4 to the hand, and, in addition, the vibration transmitted to the rod bodies 7 and 8 is also transmitted from the rod bodies 7 and 8 to the grip tube 2 and transmitted from the grip tube 2 to the hand. Therefore, even a small vibration such as a small bite from a fish can be sensed by the hand's palm with high sensitivity. Further, the first grip portion 20 is separated outward in the radial direction from the rod bodies 7 and 8, and an annular hollow portion is provided between the first grip portion 20 and the rod bodies 7 and 8. Further, the inside of the second grip portion 22 is also entirely hollow 22c. Therefore, the first grip portion 20 and the second grip portion 22 of the grip tube 2 can be caused to resonate at a specific frequency. In particular, the grip tube 2 has a shape in which the diameter increases forward, with increasing distance from the straight portion 21b, due to the tapered portion 21a and the tapered portion 20b and in addition, a hollow portion on the inner side expands forward, with increasing distance from the straight portion 21b, and thus, the vibration transmitted from the rod bodies 7 and 8 to the straight portion 21b is amplified by the horn effect and transmitted to the first grip portion 20. Further, the grip tube 2 has a shape in which the diameter increases rearward, with increasing distance from the straight portion 21b, due to the tapered portion 21c and the tapered portion 22a, and thus, the vibration transmitted from the rod bodies 7 and 8 to the straight portion 21b is amplified at the rear side by the horn effect and transmitted to the second grip portion 22.

Further, the small-diameter portion 21 of the grip tube 2 is supported from the inside by the rod bodies 7 and 8, and thus, the grip tube 2 can be surely fixed. Moreover, since the straight portion 21b is provided in the small-diameter portion 21 and the straight portion 21b is supported by the rod bodies 7 and 8, the grip tube 2 can be firmly fixed without wobbling. In this manner, the straight portion 21b is firmly supported and fixed from the inside by the rod bodies 7 and 8, and further, the front end of the grip tube 2 having a large diameter is supported from the inside by the rear cylindrical portion 52, and thus, the grip tube 2 can be surely stabilized.

Further, the front end of the grip tube 2 is connected and fixed to the reel seat main body 4 via the supporting body 9 having an inner space 9a thereinside, and thus, the grip tube 2 can be surely joined to the rear side of the reel seat main body 4. Accordingly, even if the first grip portion 20 and the second grip portion 22 are tightly gripped, the grip tube 2 can be stably gripped without wobbling.

Moreover, the joint body 8 that is formed separately from the main body 7 is joined to the rear part of the main body 7 so that the straight portion 21b is supported by the joint body 8, and thus, restrictions on the design of the main body 7 are reduced, and the state of the main body 7 can be easily set. On the other hand, since the joint body 8 is formed separately from the main body 7, the diameter of the joint body 8 can be easily adjusted to the straight portion 21b. Further, the reel seat main body 4 is attached to the outer side of the joint body 8 and the main body 7 is joined to the inner side of the joint body 8, and thus, a butt portion of the main body 7 can be designed to be small diameter and the main body 7 extending forward from the reel seat 1 has excellent aesthetic appearance. Further, the outer diameter of the joint body 8 can be easily adjusted to the diameter of the rod insertion hole 10, and the reel seat main body 4 can be directly adhered and fixed to an outer peripheral surface of the joint body 8.

Further, since the joint body 8 includes the tapered portion 41, the diameter of the straight portion 21b can be easily reduced. Accordingly, the small-diameter portion 21 as a large constricted shape can be formed between the first grip portion 20 and the second grip portion 22, and due to the small-diameter portion 21, the first grip portion 20 and the second grip portion 22 can be formed in a clear grip shape.

Further, by providing the flange 51 on the supporting body 9 and exposing the flange 51 from between the reel seat main body 4 and the grip tube 2, the aesthetic appearance can be improved. In particular, when the supporting body 9 is made of metal, the thickness of the supporting body 9 can be reduced, and the aesthetic appearance and the feel of the material of the outer peripheral surface of the flange 51 can be improved. Further, by bringing the reel seat main body 4 and the grip tube 2 into contact with the front surface and the rear surface of the flange 51, respectively, the grip tube 2 can be surely positioned with respect to the reel seat main body 4.

Figure 10:
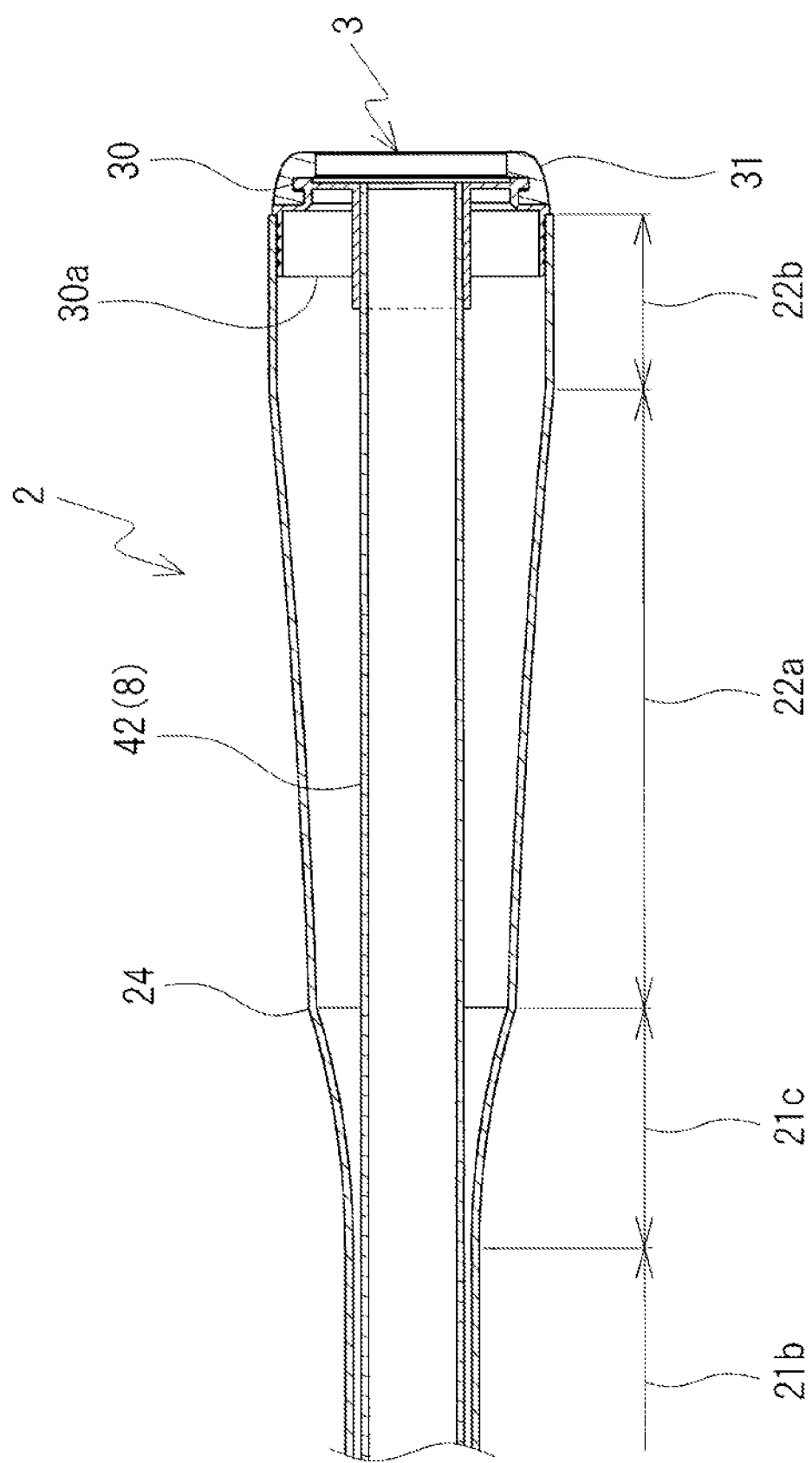
FIG. 10 is a vertical cross-sectional view illustrating main parts of a fishing rod according to another embodiment of the present invention.

Note that, in the present embodiment, the joint body 8 is joined to the straight portion 21b, however, as illustrated in FIG. 10, for example, the joint body 8 may be extended to the tail plug 3 and connected to the tail plug 3. When the joint body 8 is connected to the tail plug 3 in this manner, for example, the rear end of the joint body 8 may overlap with and be joined to the support member 30. In the configuration illustrated in FIG. 10, the joint body 8 has a smaller diameter than the straight portion 21b and is not joined to the straight portion 21b, however, a configuration is possible in which the joint body 8 is connected to the tail plug 3 and the joint body 8 is joined to the straight portion 21b. Further, if the joint body 8 is connected to the tail plug 3, the straight portion 21b may not be provided in the small-diameter portion 21.

Further, in the above-described embodiment, the joint body 8 is provided separately from the main body 7, however, the joint body 8 may not be provided and the main body 7 may be extended rearward and connected to the small-diameter portion 21 or the tail plug 3 of the grip tube 2. Further, the reel seat main body 4 may be attached to the main body 7, directly or with a spacer interposed between the reel seat main body 4 and the main body 7.

Further, the supporting body 9 is provided between the reel seat main body 4 and the grip tube 2, and the front end of the grip tube 2 is supported from the inside by the rear cylindrical portion 52. However, a cylindrical portion extending rearward may be integrally formed on the rear end of the reel seat body 4, and this cylindrical portion may be inserted inside the grip tube 2 so that the cylindrical portion supports the front end of the grip tube 2 from the inside.

Note that the grip tube 2 may be a molded product made of a synthetic resin, or may be made of a metal.

Further, description has been given of a fishing rod on which the reel seat 1 for a double-bearing reel is mounted, however, the fishing rod may also be a fishing rod on which a reel seat for a spinning reel is mounted.

REFERENCE SIGNS LIST

1 Reel seat
2 Grip tube
3 Tail plug
4 Reel seat main body
5 Movable hood
6 Fixing nut
7 Main body (Rod body)
8 Joint body (Rod body)
9 Supporting body
10 Rod insertion hole
11 Reel foot attachment portion
12 Fixing hood
13 Male screw
14 Window hole
15 Trigger
16 Recessed portion
17 Rear cylindrical main body portion
20 First grip portion
20a Straight portion
20b Tapered portion
21 Small-diameter portion
21a Tapered portion
21b Straight portion
21c Tapered portion
22 Second grip portion
22a Tapered portion
22b Straight portion
23 Front corner portion
24 Rear corner portion
30 Support member
30a Cylindrical insertion portion
31 Buffer member
40 Front joining part
41 Tapered portion
42 Rear joining part
50 Front cylindrical portion
51 Flange
52 Rear cylindrical portion
90 Front mandrel
90a Straight portion
91 Rear mandrel
91a Straight portion
92 Formation region of grip tube

The invention claimed is:

1. A fishing rod extending from a forward side to a rear side, the fishing rod comprising,
a rod body;
a reel seat attached to the rod body;
a grip tube provided on the rear side of the reel seat, the grip tube is separatable from the rod body, the grip tube contacting the reel seat at the rear side thereof and extended to reach a rear end of the fishing rod, the rear end of the grip tube configured to be attached to a tail plug, wherein the grip tube consists of:
- a first grip portion having a first outside surface, and a first inside surface to form a first single hollow extending inside the first grip portion, the first outside surface forming a first tapered portion such that the first outside surface has a diameter gradually decreased toward the rear side and the first inside surface has a diameter gradually decreased toward the rear side;
- a second grip portion provided away from the first grip portion and at the rear side of the first grip portion, the second grip portion having a second outside surface and a second inside surface to form a second single hollow extending inside the second grip portion, the second outside surface forming a second tapered portion such that the second outside surface has a diameter gradually increased toward the rear side and the second inside surface has a diameter gradually increased toward the rear side; and
- a small-diameter portion provided between the first grip portion and the second grip portion, the small-diameter portion having a part having a third outside surface and a third inside surface, the third outside surface has a diameter smaller than the first outer diameter and the second outer diameter, and
- a supporting body at the forward side inside the first grip portion, the supporting body contacting the reel seat or extending from the reel seat toward the rear side,
- wherein the first grip portion, the second grip portion and the small-diameter portion are integrally formed as a single body,
- wherein the rod body is extended to the rear side of the reel seat to pass through the first grip portion and be connected to the third inside surface,
- wherein the first single hollow extends throughout inside the first grip portion from the supporting body to the small-diameter portion.

2. The fishing rod according to claim 1, wherein the small-diameter portion includes a straight portion, the diameter of the small-diameter portion at the straight portion is constant.

3. The fishing rod according to claim 2, wherein the rod body is connected to the straight portion.

4. The fishing rod according to claim 1, wherein the rod body comprises:
- a main body extending at the forward side of the reel seat; and
- a joint body connected to the main body, the joint body extending at the rear side of the real seat such that the main body, the reel seat and the joint body are in this order,
- wherein the joint body is connected to the small-diameter portion.

5. The fishing rod according to claim 1, wherein the rod body has an end at the rear side, the end locating in the inside of the small-diameter portion.

6. The fishing rod according to claim 1, further comprising a tail plug attached to the grip tube, the rod body is connected to the tail plug.

7. The fishing rod according to claim 1, wherein the rod body is made of a fiber-reinforced resin.

8. The fishing rod according to claim 1, further comprising a supporting body at the forward side inside the first grip portion.

9. The fishing rod according to claim 8, wherein the reel seat comprising a recessed portion therein, the recessed portion communicating with the first single hollow through an inner space provided in the supporting body.

10. The fishing rod according to claim 1, wherein the part forms a third tapered portion such that the third inside surface has a diameter gradually decreased toward the rear side,
- wherein the small-diameter portion further comprises a third hollow,
- wherein the third hollow communicates with the first single hollow.

* * * * *